Dec. 12, 1944.  H. G. LAUGHLIN ET AL  2,364,799
CONCENTRATION OF SLURRIES
Filed March 24, 1941
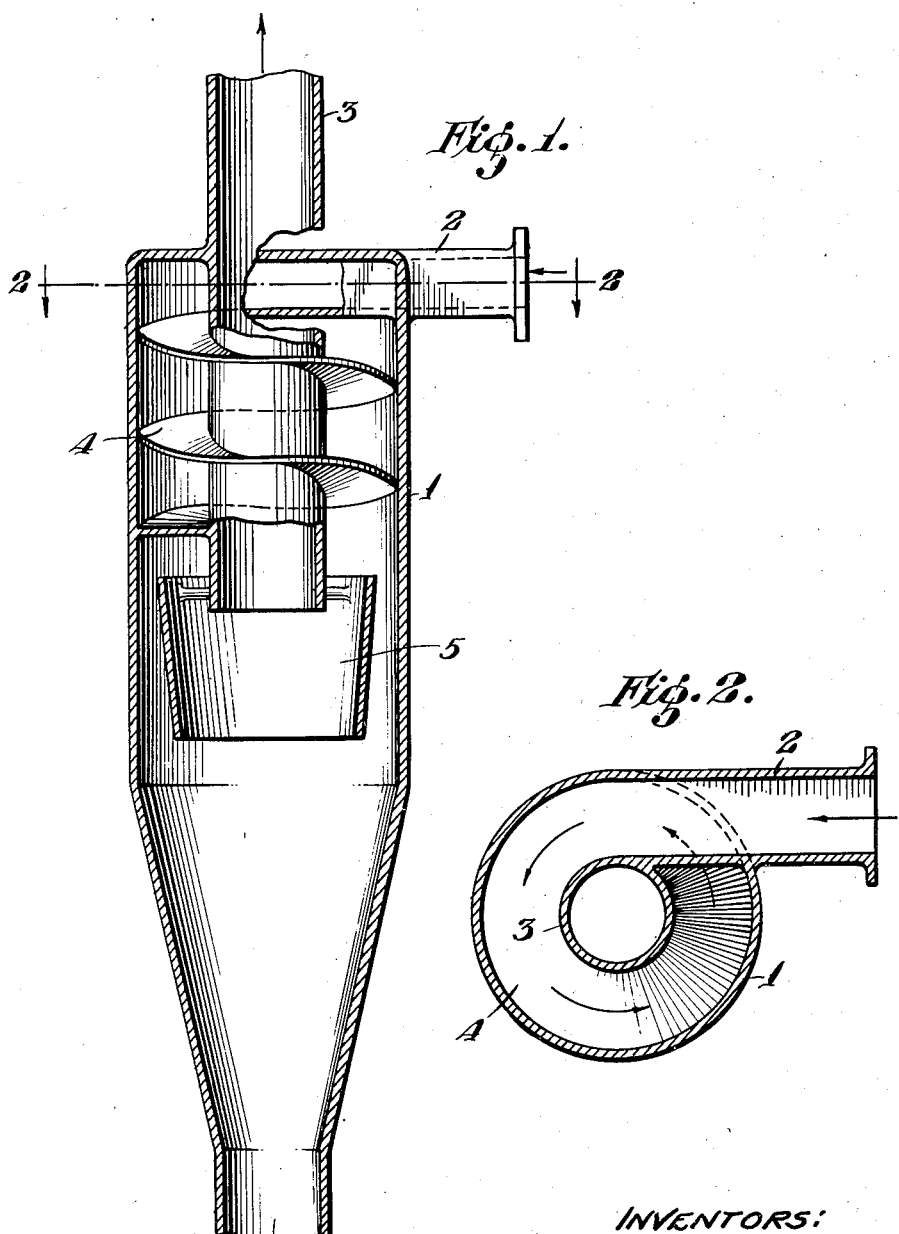
INVENTORS:
HERMAN G. LAUGHLIN
AND GERALD J. RISSER
BY Theodore J. Bulow
ATTORNEY Patented Dec. 12, 1944

2,364,799

UNITED STATES PATENT OFFICE 2,364,799

CONCENTRATION OF SLURRIES

Herman G. Laughlin, Tonawanda, and Gerald J. Risser, Niagara Falls, N. Y., assignors to E. I. du Pont de Nemours & Company, Wilmington, Del., a corporation of Delaware Application March 24, 1941, Serial No. 384,926

14 Claims. (Cl. 210—58)

This invention relates to the concentration of slurries and particularly to a novel apparatus for the concentration of slurries.

In the purification of salts such as sodium chloride it is usually necessary to use large volumes of water which must be removed in order to recover the purified salt. Ordinarily this may be accomplished by evaporating solutions of the salts to obtain a dilute slurry, concentrating to a heavy slurry by means of large settling equipment, filtering to remove the solid salt, and repeating these operations. During the concentrating operation large volumes of liquid are removed by passing the dilute slurry through settlers at low velocity. Conventional settlers are costly and require considerable floor space. Due to the large volumes and surface areas required, serious heat losses occur by radiation and convection and must be replaced in the subseqent evaporation step. Such losses of heat necessarily add to the cost of the purified material.

It is one of the objects of this invention to provide a novel and practical method and apparatus for the concentration of slurries. A further object is to provide a means for the concentration of slurries which is simple, efficient, and suitable for rapid and continuous operation. These and other objects will be apparent from the ensuing description of our invention.

These objects are attained in accordance with our invention by providing a centrifugal separator of novel design. The centrifugal separator of our invention comprises a vertical cylindrical body having a closed top and an inlet connected tangentially to its upper part. A vertical conduit is situated concentrically within the body of the separator and extends through the top thereof. A vertical baffle of circular horizontal cross-section and concentric with the cylindrical wall of the separator is located at the lower extremity of the vertical conduit.

We have further discovered that even more efficient action is obtained by the arrangement of a baffle situated in the annular space between the vertical conduit and the wall of the separator so arranged as to form a substantially helical passageway through the major portion of the annular space.

Our invention is illustrated by the accompanying drawings in which Figure 1 is a vertical section of our novel centrifugal separator in preferred form and Figure 2 is a horizontal section along lines 2—2 of Figure 1. Corresponding parts in Figs. 1 and 2 have like reference numbers.

Referring to Figure 1, I is a vertical cylindrical body with its lower part ending in a conduit. 2 is an inlet connected tangentially to the upper part of the cylindrical body and extending to helical baffle 4 which surrounds the concentric vertical conduit 3. 5 is the concentric vertical baffle in preferred form.

In the operation of our invention the slurry to be concentrated is forced by a pump, gravity, or other means through inlet 2 and follows the helical passage defined by baffle 4. During the rotation of the slurry, the solid particles are forced to the outside and follow a path adjacent the circumference of the cylindrical separator, while the comparatively clear liquid remains in that section of the separator near the circumference of the vertical conduit. The vertical baffle 5 separates the concentrated slurry from the comparatively clear liquor and the latter rises and leaves the separator through the vertical conduit 3 while the concentrated slurry exits through the outlet in the bottom of the separator. The separator is operated so as to be completely filled during operation. The rate at which the slurry is fed may be regulated so as to obtain the desired degree of separation.

It has been found that the upper extremity of the concentric baffle illustrated at 5 must have a diameter greater than the diameter of the opening in the vertical conduit and this feature is essential to the successful operation of our invention. Furthermore, we have found that the most efficient concentration is obtained when this concentric baffle has the shape of the inverted frustum of a cone, as shown in the drawings and, in a preferred embodiment, the minimum diameter of this baffle is greater than the diameter of the lower extremity of the vertical conduit. The concentric baffle is located at the lower extremity of the vertical conduit and may be either completely or partially within the annular space between the vertical conduit and the wall of the separator and in one modification of our invention the concentric baffle may be arranged entirely below the lower extremity of the vertical conduit. Preferably the baffle is located at least partially within the annular space between the vertical conduit and the wall of the separator and extends below the lower extremity of the vertical conduit since we have found that the most efficient operation is obtained with this arrangement. The function of this concentric baffle is to separate concentrated slurry and comparatively clear liquor and to deflect the latter into the vertical conduit. This baffle may be fastened to the vertical conduit by means of rods or narrow strips.

In a preferred form of our invention as illustrated in Figure 1 the vertical conduit is surrounded by a substantially helical baffle the function of which is to insure adequate and directional rotation of the incoming slurry. Furthermore, in the preferred embodiment of our invention illustrated, the inlet 2 extends through the wall of the separator and provides an enclosed passage to the entrance of the helical passage defined by baffle 4, thus preventing change in the direction of flow of incoming slurry before entering the helical passage. Such an arrangement tends to prevent turbulent flow within the space between the inlet and the vertical conduit and consequent loss in efficiency. The number of turns in this helical baffle may vary considerably for the concentration of different slurries, and also may be adjusted to produce the most efficient results with a given rate of flow. For instance, we have found that a helical baffle having four complete turns around the vertical conduit is very effective in concentrating a salt slurry containing about 5% solids and, in a preferred embodiment of our invention, the helical baffle contains not less than four complete turns since we have discovered that a baffle having less than four complete turns is not as efficient for concentrating such slurries as is a helical baffle having four or more complete turns.

The centrifugal separator of our invention may be constructed of any suitable material which will be apparent to those skilled in the art and will depend upon the composition of the slurry to be concentrated. For example, we have found that a separator constructed of nickel or of nickel-clad steel successfully resists the corrosive and abrasive action of a salt slurry.

The centrifugal separator of our invention is generally useful in the concentration of slurries and has wide application in this field. For example, our invention has been utilized to concentrate a dilute salt slurry containing about 5% solids by weight to a slurry containing about 25% solids, without difficulty and it has been found possible to obtain slurries of much higher concentration where desirable. With suitable regulation our invention may also be effectively used as a classifier.

The apparatus of our invention is economical to install and maintain because it is simple to construct and contains no moving parts. It requires little space and avoids the necessity for storing large volumes of slurry. Thus the system may be drained without substantial losses in material when operation is interrupted. A further important advantage of our centrifugal separator resides in the fact that the concentration of slurries is carried out in a closed system thus avoiding aeration which in many cases causes an increase in the corrosive action of the liquor and consequent increase in the cost of maintaining equipment.

The centrifugal separator of our invention may be operated at any desired pressure and is therefore readily adaptable to various types of operation. The degree of concentration may be controlled by regulating the rate of concentrate removal and it is therefore possible to obtain a specified concentration of slurry.

In large settling tanks such as are commonly used for the concentration of slurries the time required for proper concentration permits crystal growth which may be undesirable because of inclusion of impurities or variation in particle size whereas in the apparatus of the present invention little or no crystal growth is possible because of the comparatively high velocity utilized.

Utilization of our invention reduces heat losses to a minimum and this is an important factor, particularly in large scale operation.

Other advantages and modifications will be apparent to those skilled in the art without departing from the scope of our invention.

I claim:

1. A centrifugal separator comprising a vertical hollow cylinder having a closed top, an inlet connected with said vertical hollow cylinder in its upper part, said inlet being so arranged as to lead fluid into said vertical hollow cylinder in a substantially tangential direction, a vertical effluent conduit situated concentrically within said vertical hollow cylinder and extending through the top of said vertical hollow cylinder, an annular space lying between said effluent conduit and the interior circumferential surface of said vertical hollow cylinder, helical baffle means situated in said annular space, said helical baffle means being so arranged in relation to said vertical conduit and the interior circumferential surface of said vertical hollow cylinder as to define a substantially helical passageway throughout at least the major part of said annular space and a vertical baffle of circular horizontal cross-section located concentrically within the lower part of said annular space below said helical baffle means and extending below the lower end of said vertical conduit, the diameter of the upper extremity of said vertical baffle being greater than the diameter of the lower extremity of said vertical conduit, and an outlet at the bottom of said vertical hollow cylinder.

2. The apparatus of claim 1 wherein said baffle of circular horizontal cross-section is the shape of an inverted frustum of a cone.

3. A centrifugal separator comprising a vertical hollow cylinder having a closed top, an inlet connected with said vertical hollow cylinder in its upper part said inlet being so arranged as to lead fluid into said vertical hollow cylinder in a substantially tangential direction, a vertical effluent conduit situated concentrically within said vertical hollow cylinder and extending through the top of said vertical hollow cylinder, an annular space lying between said effluent conduit and the interior circumferential surface of said vertical hollow cylinder, a helical baffle having at least four complete turns situated in said annular space said helical baffle having at least four complete turns being so arranged in relation to said vertical conduit and the interior circumferential surface of said vertical hollow cylinder as to define a substantially helical passageway throughout at least the major part of said annular space, and a vertical baffle of circular horizontal cross-section located concentrically within the lower part of said annular space below said helical baffle and extending below the lower end of said vertical conduit, said vertical baffle having a minimum diameter greater than the diameter of the lower extremity of said vertical conduit, and an outlet at the bottom of said vertical hollow cylinder.

4. A centrifugal separator comprising a vertical hollow cylinder having a closed top, an inlet connected with said vertical hollow cylinder in its upper part said inlet being so arranged as to lead fluid into said vertical hollow cylinder in a substantially tangential direction, a vertical effluent conduit situated concentrically within said vertical hollow cylinder and extending through the top of said vertical hollow cylinder, and a vertical baffle of circular horizontal cross-section located concentrically with, and at the lower extremity of, said vertical conduit the diameter of the upper extremity of said vertical baffle being greater than the diameter of the lower extremity of said vertical conduit, and an outlet at the bottom of said vertical hollow cylinder.

5. The apparatus of claim 4 wherein said baffle of circular horizontal cross-section is the shape of an inverted frustum of a cone.

6. A centrifugal separator comprising a vertical hollow cylinder having a closed top, an inlet connected with said vertical hollow cylinder in its upper part said inlet being so arranged as to lead fluid into said vertical hollow cylinder in a substantially tangential direction, a cylindrical effluent conduit within and concentric with said vertical hollow cylinder and extending through the top of said vertical hollow cylinder, an annular space lying between said effluent conduit and the interior circumferential surface of said vertical hollow cylinder, helical baffle means situated in said annular space said helical baffle means being so arranged in relation to said effluent conduit and the interior circumferential surface of said vertical hollow cylinder as to define a substantially helical passageway throughout at least the major part of said annular space, and a vertical baffle of circular horizontal cross-section located concentrically within the lower part of said annular space below said helical baffle means and extending below the lower end of said effluent conduit, the diameter of the upper extremity of said vertical baffle being greater than the diameter of the lower extremity of said effluent conduit, and an outlet at the bottom of said vertical hollow cylinder.

7. A centrifugal separator comprising a vertical hollow cylinder having a closed top, an inlet connected with said vertical hollow cylinder in its upper part said inlet being so arranged as to lead fluid into said vertical hollow cylinder in a substantially tangential direction, a cylindrical effluent conduit within and concentric with said vertical hollow cylinder and extending through the top of said vertical hollow cylinder, an annular space lying between said effluent conduit and the interior circumferential surface of said vertical hollow cylinder, helical baffle means situated in said annular space said helical baffle means being so arranged in relation to said effluent conduit and the interior circumferential surface of said vertical hollow cylinder as to define a substantially helical passageway throughout at least the major part of said annular space, and a concentric baffle of substantially circular horizontal cross-section located within the lower extremity of said annular space and extending below the lower end of said effluent conduit, said concentric baffle having a minimum diameter greater than the diameter of the lower extremity of said cylindrical effluent conduit, and an outlet at the bottom of said vertical hollow cylinder.

8. The apparatus of claim 7 wherein said baffle of substantially circular horizontal cross-section is the shape of an inverted frustum of a cone.

9. A centrifugal separator comprising a vertical hollow cylinder having a closed top, an inlet connected with said vertical hollow cylinder in its upper part said inlet being so arranged as to lead fluid into said vertical hollow cylinder in a substantially tangential direction, a cylindrical effluent conduit within and concentric with said vertical hollow cylinder and extending through the top of said vertical hollow cylinder, and a concentric baffle of substantially circular horizontal cross-section located within the lower extremity of an annular space defined by said effluent conduit and the interior circumferential surface of said vertical hollow cylinder and extending below the lower end of said effluent conduit the diameter of the upper extremity of said concentric baffle being greater than the diameter of the lower extremity of said cylindrical effluent conduit, and an outlet at the bottom of said vertical hollow cylinder.

10. The apparatus of claim 9 wherein said baffle of substantially circular horizontal cross-section is the shape of an inverted frustum of a cone.

11. A centrifugal separator comprising a vertical hollow cylinder having a closed top, an inlet connected with said vertical hollow cylinder in its upper part said inlet being so arranged as to lead fluid into said vertical hollow cylinder in a substantially tangential direction, a vertical effluent conduit situated concentrically within said vertical hollow cylinder and extending through the top of said vertical hollow cylinder, an annular space lying between said effluent conduit and the interior circumferential surface of said vertical hollow cylinder, helical baffle means situated in said annular space said helical baffle means being so arranged in relation to said vertical conduit and the interior circumferential surface of said vertical hollow cylinder as to define a substantially helical passageway throughout at least the major part of said annular space, said inlet extending to the entrance to said substantially helical passageway and a vertical baffle of circular horizontal cross-section located concentrically within the lower part of said annular space below said helical baffle means and extending below the lower end of said vertical conduit, the diameter of the upper extremity of said vertical baffle being greater than the diameter of the lower extremity of said vertical conduit, and an outlet at the bottom of said vertical hollow cylinder.

12. The apparatus of claim 11 wherein said baffle of circular horizontal cross-section is the shape of an inverted frustum of a cone.

13. A centrifugal separator comprising a vertical hollow cylinder having a closed top, an inlet connected with said vertical hollow cylinder in its upper part said inlet being so arranged as to lead fluid into said vertical hollow cylinder in a substantially tangential direction, a vertical effluent conduit situated concentrically within said vertical hollow cylinder and extending through the top of said vertical hollow cylinder, an annular space lying between said effluent conduit and the interior circumferential surface of said vertical hollow cylinder, a helical baffle having at least four complete turns situated in said annular space said helical baffle having at least four complete turns being so arranged in relation to said vertical conduit and the interior circumferential surface of said vertical hollow cylinder as to define a substantially helical passageway throughout at least the major part of said annular space, said inlet extending to the entrance to said substantially helical passageway, and a vertical baffle of circular horizontal cross-section located concentrically within the lower part of said annular space below said helical baffle and extending below the lower end of said vertical conduit, the diameter of the upper extemity of said vertical baffle being greater than the diameter of the lower extremity of said vertical conduit, and an outlet at the bottom of said vertical hollow cylinder.

14. A centrifugal separator comprising a vertical hollow cylinder having a closed top, an inlet connected with said vertical hollow cylinder in its upper part said inlet being so arranged as to lead fluid into said vertical hollow cylinder in a substantially tangential direction, a cylindrical effluent conduit within and concentric with said vertical hollow cylinder and extending through the top of said vertical hollow cylinder, an annular space lying between said effluent conduit and the interior circumferential surface of said vertical hollow cylinder, helical baffle means situated in the annular space said helical baffle means being so arranged in relation to said effluent conduit and the interior circumferential surface of said vertical hollow cylinder as to define a substantially helical passageway throughout at least the major part of said annular space said inlet extending to the entrance to said substantially helical passageway and a vertical baffle of circular horizontal cross-section located concentrically within the lower part of said annular space below said helical baffle means and extending below the lower end of said effluent conduit, the diameter of the upper extremity of said vertical baffle being greater than the diameter of the lower extremity of said effluent conduit, and an outlet at the bottom of said vertical hollow cylinder.

HERMAN G. LAUGHLIN.
GERALD J. RISSER.